United States Patent [19]

Chanvin et al.

[11] Patent Number: 4,847,894

[45] Date of Patent: Jul. 11, 1989

[54] DEVICE FOR AIDING MAINTENANCE OF AN ELECTROMECHANICAL INSTALLATION HAVING AUTOMATIC MONITORING AND CONTROL MEANS

[75] Inventors: Jean-Louis Chanvin, Colombes; Anselme Cote, Yerres; Georges Menou, Sevran, all of France

[73] Assignees: Spie-Batignolles, Puteaux; Regie Autonome des Transports Parisiens, Paris, both of France

[21] Appl. No.: 935,851

[22] Filed: Nov. 28, 1986

[30] Foreign Application Priority Data

Nov. 29, 1985 [FR] France ............... 85 17690

[51] Int. Cl.⁴ .......................................... H04M 11/00
[52] U.S. Cl. .................................... 379/104; 379/106
[58] Field of Search ......... 340/870.01, 870.05–870.09; 379/101–106; 364/200 MS File, 900 MS File

[56] References Cited

U.S. PATENT DOCUMENTS

| | | |
|---|---|---|
| 3,882,305 | 5/1975 | Johnstone . |
| 4,162,536 | 7/1979 | Morley ..................... 364/200 X |
| 4,213,174 | 7/1980 | Morley et al. ............. 364/900 X |
| 4,281,379 | 7/1981 | Austin ....................... 364/200 X |
| 4,591,967 | 5/1986 | Mattes et al. ............. 364/200 X |
| 4,777,607 | 10/1988 | Maury et al. . |

FOREIGN PATENT DOCUMENTS

0051861 5/1982 European Pat. Off. .
0090302 10/1983 European Pat. Off. .

Primary Examiner—Keith E. George
Attorney, Agent, or Firm—Finnegan, Henderson, Farabow, Garrett & Dunner

[57] ABSTRACT

A device for aiding maintenance of an electromechanical installation, which installation has an automatic monitoring and control apparatus, provides remote supervision of the electromechanical installation. The device includes a control unit connected to the automatic monitoring and control apparatus and to the public telephone system. The device also includes at least one external supervision video terminal having a keyboard, a display screen, and a printer. The video terminal is connected to the public telephone system for remote interrogation of the control unit.

2 Claims, 12 Drawing Sheets

FIG_1

FIG_4

FIG.5

FIG_6

FIG_11

DEVICE FOR AIDING MAINTENANCE OF AN ELECTROMECHANICAL INSTALLATION HAVING AUTOMATIC MONITORING AND CONTROL MEANS

BACKGROUND OF THE INVENTION

1. Field Of The Invention

This invention relates, in general, to a device for aiding maintenance of a semi-automatic or fully automatic electromechanical installation and, more particularly, to a device for supervising the operation of independent electromechanical installations such as lifts, escalators, elevators or the like; moving sidewalks; power distribution stations; and air conditioning or ventilation stations or the like where operation is controlled either by a conventional wired logic automatic system of the relay monitoring and control cabinet type or by a programmed logic automatic system of the industrial programmable controller type.

2. Description Of Related Art

Since electromechanical installations, such as those listed above, operate either semi-automatically or fully automatically, they must be supervised continuously. In practice, a general distinction is drawn between two levels of supervision regardless of the type of installation: (1) operational supervision which is usually provided locally by operators responsible for all or part of the operation of the installation; and (2) technical supervision which is provided by maintenance personnel responsible for repairing or maintaining the installation.

For these two supervision functions to be accomplished, supervising devices are used which automatically transmit to the operators all particular about the operation of the installation. Devices for aiding maintenance are also used which operate to acquire and impart information enabling the maintenance personnel to do their work accurately and rapidly.

Since maintenance centers are usually geographically remote from the installations, it has become necessary to transmit the information over a distance. This has been done by means of special circuits extending to a computer or by special telephone circuits extending to a data processing terminal.

Some known facilities provide the above two supervision functions simultaneously. For the sake of safety these facilities should use special transmission lines extending to a central computer which interrogates the installations constantly. These known facilities require complex infrastructures and rapidly become saturated when a large number of installations are supervised There are also supervising systems which automatically remote-transmit information over the public telephone system. However, these simple and less expensive systems do not offer the safety guarantees required for industrial use. The simultaneous performance of the two supervision functions, therefore, makes it necessary to use either costly and elaborate facilities or unreliable low-performance facilities.

In view of safety requirements and the large number of electrical installations which are maintained simultaneously, it has been proven essential that the two supervision functions be carried out completely independently of one another.

French Patent Application No. 2,564,651 in the name of SPIE-BATIGNOLLES describes an electronic interface facility for the remote monitoring and control of electronic power distribution boards. The system is connected to a control or management system. The interface system uses a central microprocessor unit connected by a standard quad circuit to maintenance equipment. However, this system is used specifically for power distribution boards and is not adapted for the remote technical supervision of a wide variety of electromechanical installations.

It is the object of the present invention to simplify and generalize the use of these known systems and to make possible technical supervision of any semi-automatic or fully automatic electromechanical installation by means of a device for aiding maintenance using the public telephone system and connectable to an existing installation. Another object of the invention is to improve the operating quality of such installations, the working conditions of maintenance personnel, and maintenance methods.

SUMMARY OF THE INVENTION

According to the invention, the device for aiding maintenance of an electromechanical installation having automatic monitoring and control means includes a control unit connected to the automatic monitoring and control means and connected to the public telephone system by way of a modem compatible with the public telephone system. The modem is connected to the control unit by way of a series or current loop standard quad circuit, and the telephone system is connected to at least one external supervision video terminal having a keyboard, a display screen, and a printer. The video terminal is adapted for remote interrogation of the control unit by way of the public telephone system. The control unit has means for continuously analyzing and processing the data from the automatic monitoring and control means of the electromechanical installation and for analyzing the interrogations from the video terminal and transmitting the data to the terminal, means for storing such data, and means for registering such data locally.

With the present invention, it is possible to obtain on request and simply and rapidly, for any electromechanical installation, from any video terminal connected to the public telephone system the following items of information:

(1) The operational states of the installation in real time;
(2) The exact reason for stoppages of the installation;
(3) The date and time of occurrence of events such as stoppages;
(4) The chronology of the events;
(5) Statistics for adapting maintenance operations to the conditions of use of the installation; and
(6) Particular information helpful in assessing the quality of operation of the installation.

With the use of the invention supervision requires no special infrastructure and can, therefore, be accomplished at less cost for many electromechanical installations. Furthermore, the installations' operating states can be determined at any time and with very high reliability.

According to a preferred embodiment of the invention, the control unit means for analyzing and processing the information from the automatic means for monitoring and control of the electromechanical installation is connected to the automatic means either by way of a standard series quad connection circuit if such automatic means comprise a programmable industrial controller or by way of an on/off connection circuit and of an input/output interface circuit when the automatic means comprises a relay monitoring and control cabinet. Preferably, the device for aiding maintenance also has a number of control units each connected to an electromechanical installation being supervised. The control units are connected by way of a pilot control unit to the public telephone system which, in turn, is connected to at least one external supervision video terminal.

Advantageously, when a number of control units are each connected to an electromechanical installation being supervised, the pilot control unit connected to the control units is an identical electronic circuit to that of the other control units and is connected to those control units by way of a diffuser circuit. The diffuser circuit provides galvanic insulation between the pilot control unit and the other control units and concentrates the corresponding connection circuits to a single modem connected to the public telephone system.

Other features and advantages of the invention will become apparent with reference to the accompanying drawings and the detailed description of the invention or may be learned by practice of the invention.

BRIEF DESCRIPTION OF THE DRAWINGS

The accompanying drawings, which are incorporated in and constitute part of the specification, illustrate embodiments of the invention and, together with description, serve to explain the principles of the invention.

Of the drawings.

DESCRIPTION OF THE PREFERRED EMBODIMENTS

Figure 1:
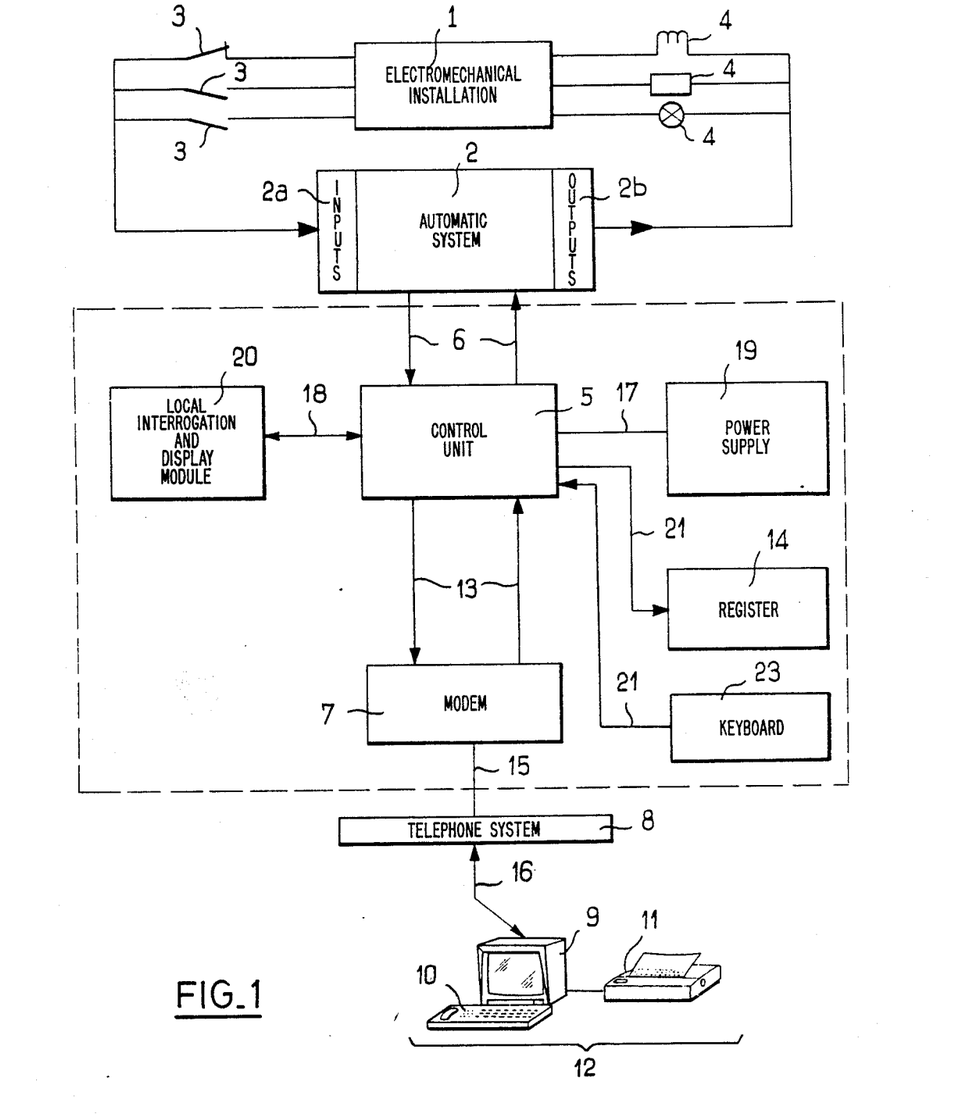
FIG. 1 is a block diagram of a device according to the invention.
Figure 3:
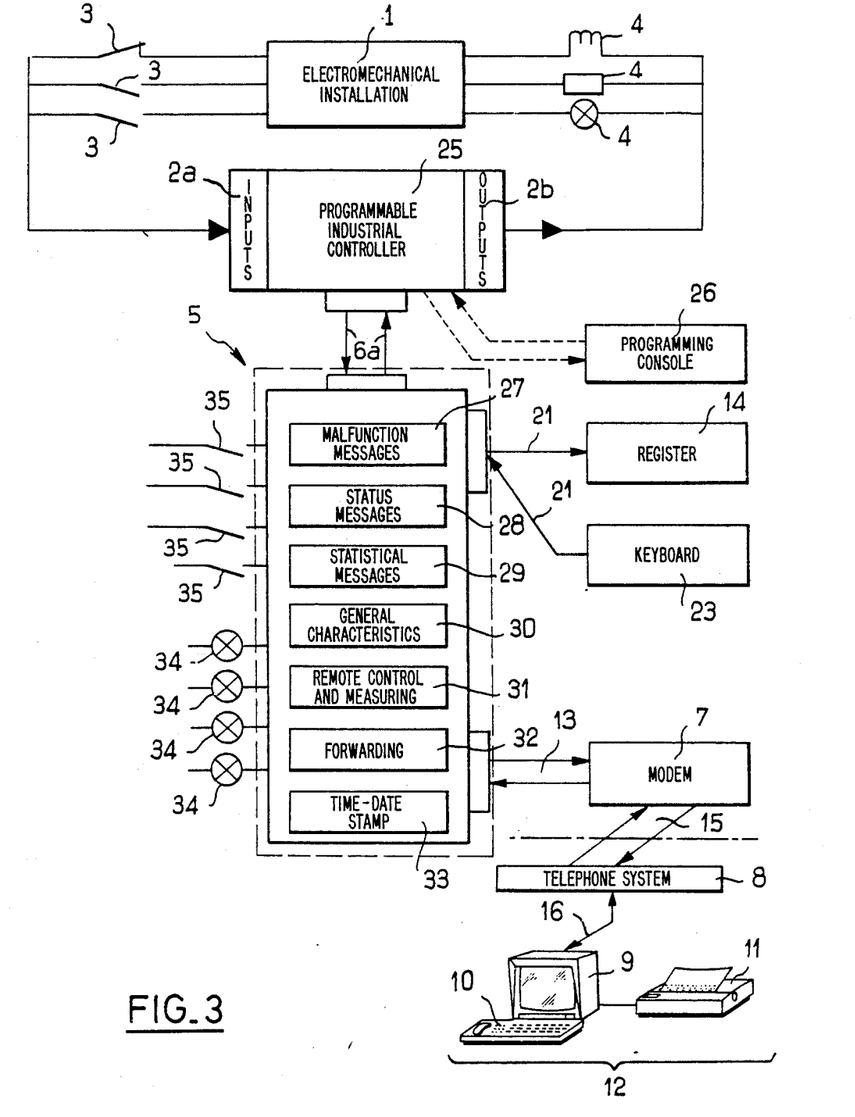
FIG. 3 is a block diagram of a device according to the invention for an electromechanical installation having a programmable industrial controller.
Figure 4:
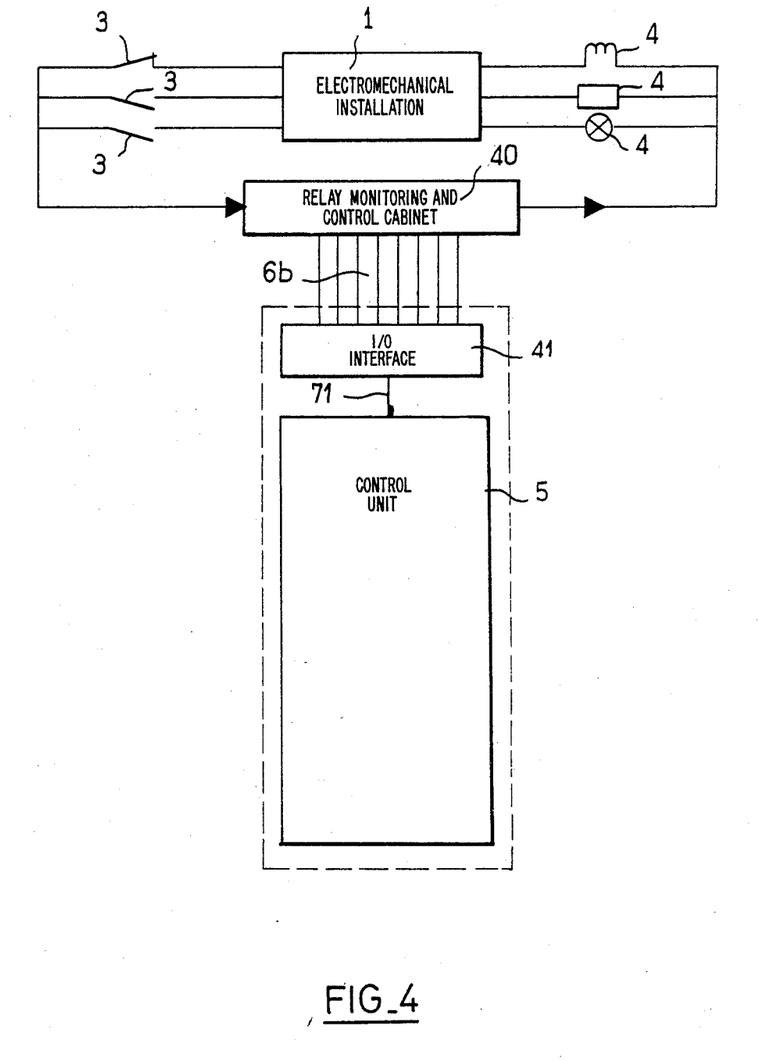
FIG. 4 is a block diagram of a device according to the invention for an electromechanical installation having a relay monitoring and control cabinet.

Referring now to the drawings, wherein like reference characters designate like or corresponding parts throughout the several drawings, there is shown in FIG. 1 the device for aiding maintenance of an electromechanical installation 1 which installation has an automatic monitoring and control means. The automatic monitoring and control means could be a conventional system, such as known automatic system 2 having inputs 2a (such as detectors 3) and outputs 2b (such as actuators 4). As illustrated the device has a control unit 5, described in greater detail below, which is connected to the automatic monitoring and control means 2 of FIG. 1 by way of a standard connection circuit 6 of the series RS 442 or RS 232C type, for example, having four conductors (two transmission wires and two reception wires). Such a connection circuit is also used for an electromechanical installation controlled by an industrial programmable controller as shown in FIG. 3. However, for an electromechanical installation controlled by a relay monitoring and control cabinet as shown in FIG. 4, an on/off type connection circuit is used for the connection.

A modulator-demodulator 7 hereafter referred to as modem, of a standard kind compatible with the public telephone exchange system 8 enables the control unit 5 to be connected to the public telephone system 8. The control unit 5 is connected to the modem by way of a standard quad connection circuit 13, which can be either a series RS 232C type or a 0–20 mA current loop type circuit. The modem 7 is connected to the public telephone system by way of a conventional telephone line 15 and at least one automatic telephone exchange facility (not shown).

The device also includes an external supervision video terminal 12 adapted to be directly connected to the public telephone system 8 by way of a standard quad connection circuit 16 which can be either a series RS 232C type or a 0–20 mA current loop type circuit, for example.

Control unit 5 is connected by an on/off type connection circuit 17 to electrical power supply means 19 adapted to supply the requisite voltages, such as A.C. voltages of 24 V, 110 V and 220 V at a frequency of 50 Hz, of 110 V at a frequency of 60 Hz, and A.C. voltages of 5 V, $-12$ V to $+12$ V, and 24 V, for example.

The control unit 5 includes means for continuously analyzing, processing and storing the information from the automatic means 2 for monitoring and control of the electromechanical installation 1. Additionally, the control unit 5 has means for analyzing interrogations from the video terminal 12 and for transmitting the information from the automatic means 2 to the terminal which converts the information into image form. These means are described in greater detail below.

The control unit 5 is also connected by way of a standard connection circuit 21 of the series RS 232C type or of the 0–20 mA current loop type, for example, to means 14 for local registering of the information from the automatic means 2 and from a keyboard 23 for local dialogue with the control unit 5. Advantageously, the registering means 14 is a printer for publishing time and date stamped text of any information requested locally. The local interrogation can be made either by means of the keyboard 23 or by way of local interrogation and display means 20 of the control unit 5 which is connected to the inputs/outputs of unit 5 by an on/off type connection circuit 18. Local interrogation and display means 20, which is described in detail below, can also provide local display of the operating states of the control unit 5. The printer 14 also registers malfunctionings of the electromechanical installation 1 as they occur.

The external supervision video terminal 12 shown in FIG. 1 includes a display screen 9, a keyboard 10, and a printer 11. The terminal 12 can interrogate from a remote location the control unit 5 by way of the public telephone system 8. It also receives the data or information from the automatic means 2, which data has been analyzed and processed by the control unit 5, and produces that data in image form for monitoring and control of the electromechanical installation 1.

The terminal 12, which is conventional and can be readily purchased, operates as follows. The data is displayed in image form on the display screen 9 which can include a cathode ray tube (not specifically shown). An electronic card (not shown), called a video card, converts the signals into images from a modem (not shown) connected to the public telephone system on the video terminal side of the system. The control unit 5 is interrogated by way of the keyboard 10 of terminal 12 which comprises alphanumerical keys, function keys, and punctuation keys. The composition of a predetermined code allows communication with the control unit 5 and the reception on request for processing into image form the above-discussed data.

Figure 2:
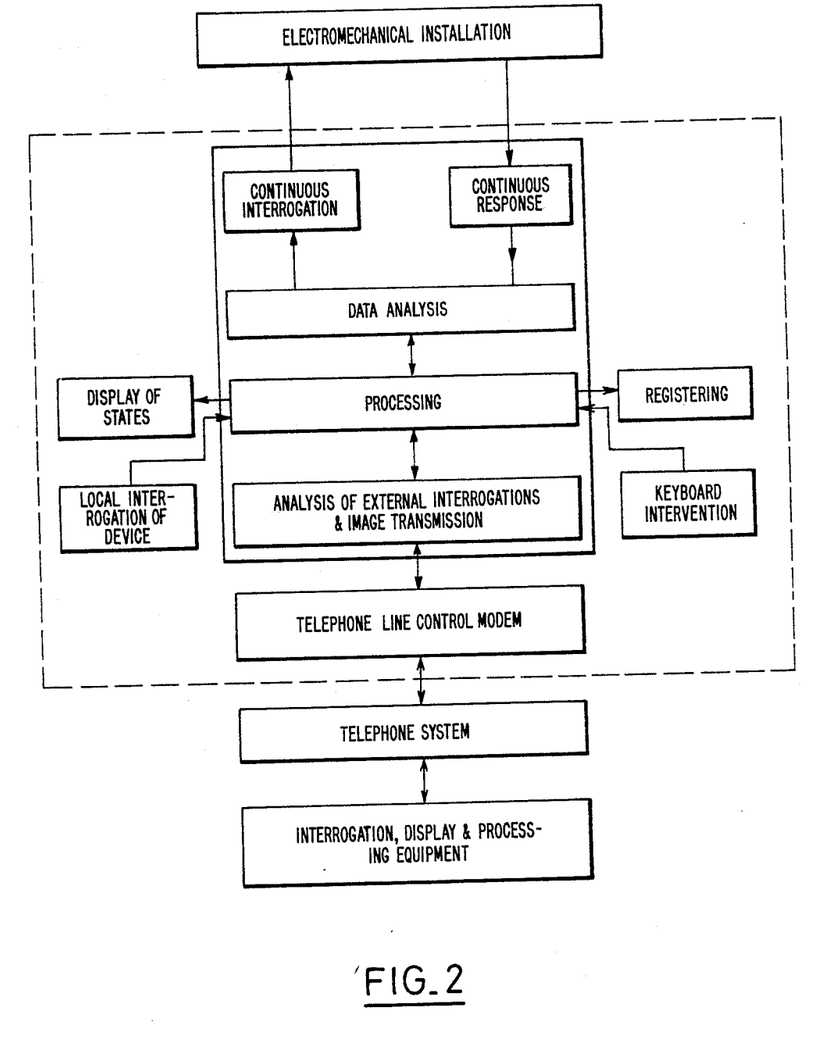
FIG. 2 is a synoptic diagram showing the operation of a device according to the invention.

The diagram of FIG. 2 shows how the device according to the invention as described with reference to FIG. 1 operates. The operation of the device will be described in greater detail below.

FIG. 3 shows a block diagram of a device according to the invention in which the automatic means 2 for monitoring and control of the electromechanical installation 1 is a conventional programmable industrial controller 25. The programmable industrial controller 25 is connected to the control unit 5 by means of a connection circuit 6a identical to the connection circuit 6 described with reference to FIG. 1 and also comprises a programming console 26. The control unit 5 also has means 27 for stack-storing malfunction messages from the electromechanical installation 1 processed through controller 25, means 28 for identically stack-storing messages concerning the states of the installation 1, means 29 for storing statistical messages on the operation of the installation 1, means 30 for storing the general characteristics of the installation, means 31 for carrying out remote-control and remote measuring operations on the installation, an electronic forwarding system 32 enabling the printer 14 to publish automatically texts typed on the video terminal keyboard 10, and means 33 for time-date stamping of the above-mentioned messages. The local interrogation and display means 20 of the control unit 5 enables local dialogue with means 27 for stack-storing malfunction messages from the electromechanical installation 1, means 28 for identically stack-storing messages concerning the states of the installation 1, means 29 for storing statistical messages through the agency of actuators 35 and, through the agency of electroluminescent diodes 34 or relays (not shown), display various operating states of the device (such as "watchdog", connection circuit with the industrial programmable controller 25 out of order, or connection circuit with the public telephone system 8 out of order).

Figure 8:
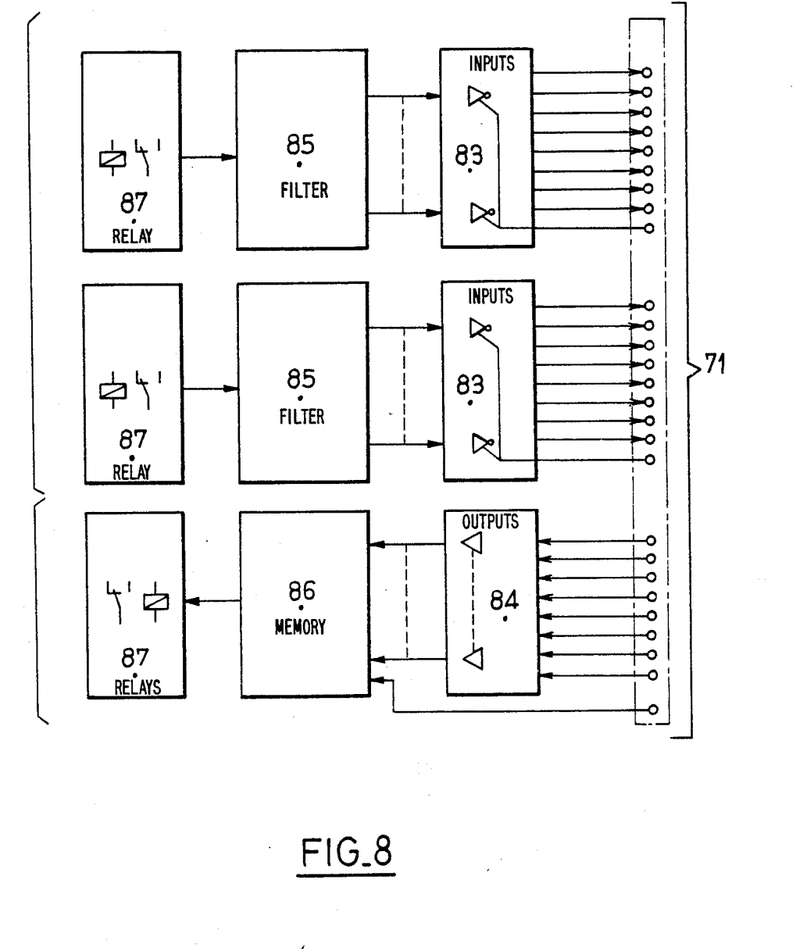
FIG. 8 is a block diagram of the input/output-on/off card of invention.

FIG. 4 is a block diagram of the device according to the invention in which the automatic means 2 for monitoring and control of the electromechanical installation 1 is a conventional relay monitoring and control cabinet 40. The relay monitoring and control cabinet 40 is connected to the control unit 5, described with reference to FIG. 3, by way of an on/off type connection circuit 6b and by an input/output interface circuit 41. The input/output interface circuit 41, which is described below with reference to FIG. 8, makes it possible to supervise any kind of semi-automatic or fully automatic electromechanical installation by means of the device described with reference to FIG. 1.

Figure 5:
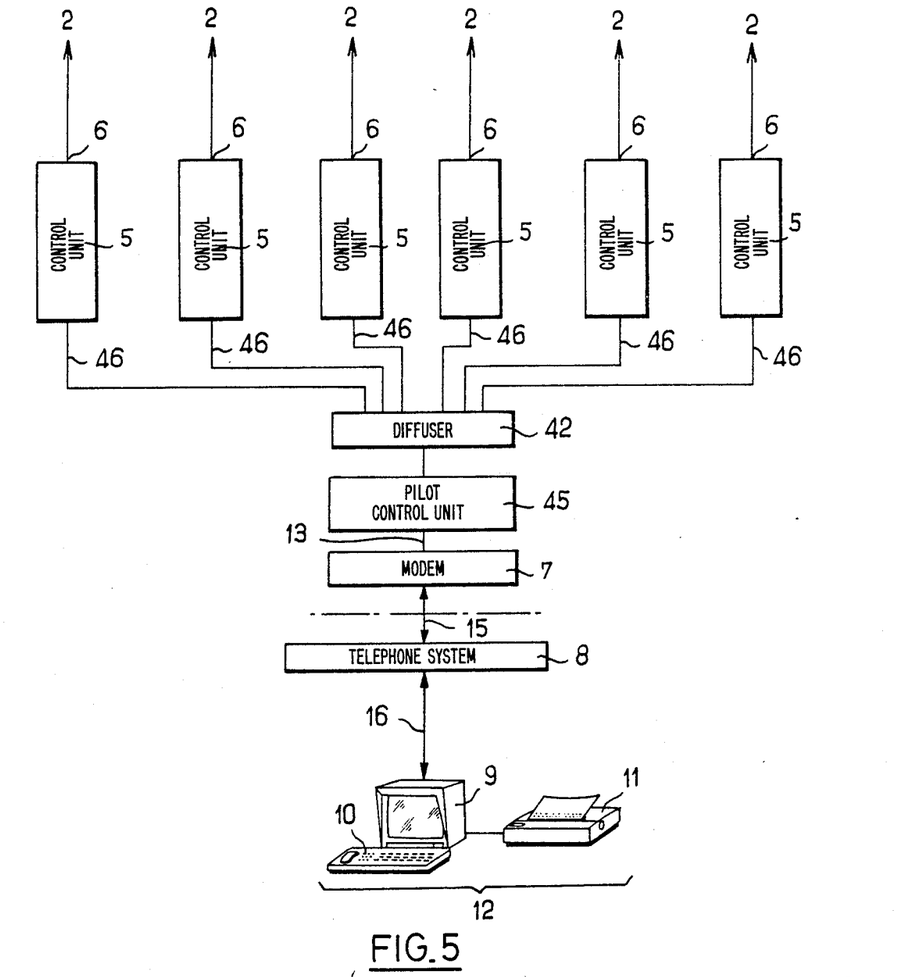
FIG. 5 is a block diagram of a device according to the invention where a number of control units are connected to a single modem by way of a pilot control unit.

FIG. 5 shows a preferred embodiment of a device according to the invention wherein a number of control units 5 are used to monitor and control a number of electromechanical installations 1. A control unit 5 is connected to an electromechanical installation 1 via the automatic means 2 associated with that installation. The plurality of the control units 5 are connected to a pilot control unit 45 by way of a diffuser circuit 42, both of which are described below in more detail. The diffuser circuit 42 also provides complete galvanic insulation between the pilot control unit 45 and each control unit 5.

The pilot control unit 45 is connected to the modem 7 by a standard quad connection circuit 13, such as the series RS 232C type or of the 0-20 mA current loop type. Each control unit 5 is connected to the diffuser circuit 42 by a connection circuit 46 of the same kind as the connection circuit 13 and to the automatic system 2 of the electromechanical installation 1 it supervises by a connection circuit 6 which has been described with reference to FIG. 1. The pilot control unit 45 makes possible the connection to the public telephone network 8 through the agency of a single modem 7 and a single telephone line 15.

The pilot control unit 45 communicates with only a single control unit 5 at a time. However, in the absence of interrogation from the external supervision video terminal 12, the pilot control unit 45 provides cyclic supervision of the connection circuits 6 and 46 extending to the installations 1 it controls and indicates any interruption in such connection circuits.

Figure 6:
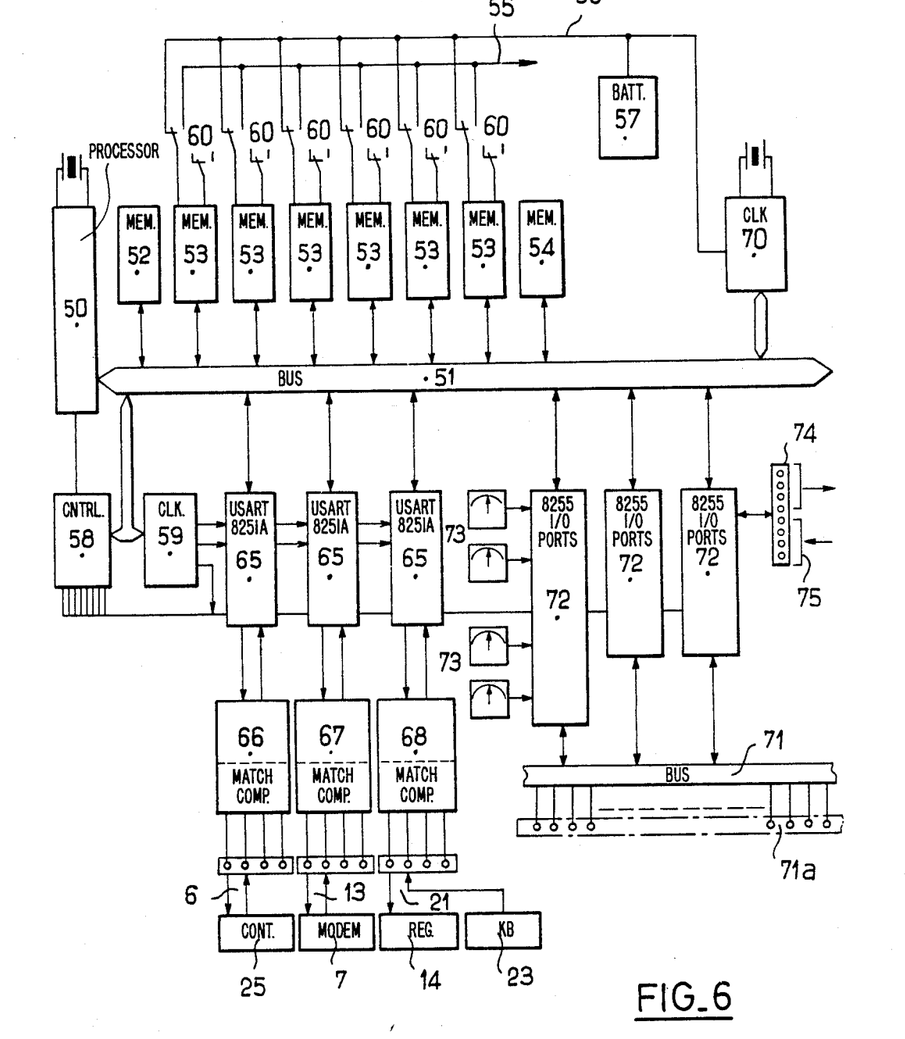
FIG. 6 is a block diagram of the control unit of the invention.

The control unit 5 is now described in detail with reference to FIG. 6. The control unit 5 uses a microprocessor 50, for example an 8085 microprocessor, whose bus 51 is connected to a type 2764 REPROM 8K memory 52, to a series of type 2764/6264 RAM/REPROM 8K memories 53 switchable either to RAM or to REPROM by means of switches 60 and to a type 6264 RAM 8K memory 54. The memories 53 are electrically energized at +5 V by a feel line from the electrical power supply means 19 (see FIG. 1) when they are switched on REPROM or by a feed line 56 from a battery 57, for example, a lithium cell, when they are switched on RAM.

The microprocessor 50 is also connected to a type 8259A IT controller 58 which is connected to the bus 51 and to a triple clock 59 (type 8253-5 timer). The microprocessor 50 is connected to three type USART 8251A components 65, which are connected to bus 51 and to components 66, 67, 68 for matching the type RS 442 or RS 232C connection circuit 6a to the industrial programmable controller 25 or to the connection circuit 46 extending to the diffuser circuit 42 (see FIG. 5), to the RS 232C or 0-20 mA current loop type connection circuit 13 extending to the modem 7, and the connection circuit 21 extending to the printer 14 and keyboard 23 as shown in FIG. 6.

The bus 51 of the microprocessor 50 is also connected to a quartz clock 70 (32.768 kHz) which is energized by the battery 57 and to a parallel bus 71 which can be connected at 71a to the interface circuit 41 by means of three type 8255 components 72. The first component 72 is connected to four decimal encoding wheels 73 and the third component 72 is connected to four on/off outputs 74 and to four on/off inputs 75.

The components described above form the means of the control unit 5 to provide continuous analysis, processing, storing and local registering of data from the industrial programmable controller 25 or the relay monitoring and control cabinet 40 which control the operation of the electromechanical installation 1 being supervised, to analyze interrogations from the video terminal 12 and transmit the data to the terminal 12, and to interrogate the control unit 5 locally and provide a local display of its operating states.

The battery 57 is operative in the event of a power supply failure affecting the control unit 5 to safeguard the data stored in the RAM memories 53 and to provide emergency power supply for operation of the time-date stamping clock 70.

The encoding wheels 73 are used for communication between the pilot control unit 45 and each dependent control unit 5. The outputs 74 are for local display of the operating states of the device ("watchdog" and connection circuits extending to the automatic control means 2 or to the modem 7 out of order) and the inputs 75 permit local interrogation of the device.

Figure 7:
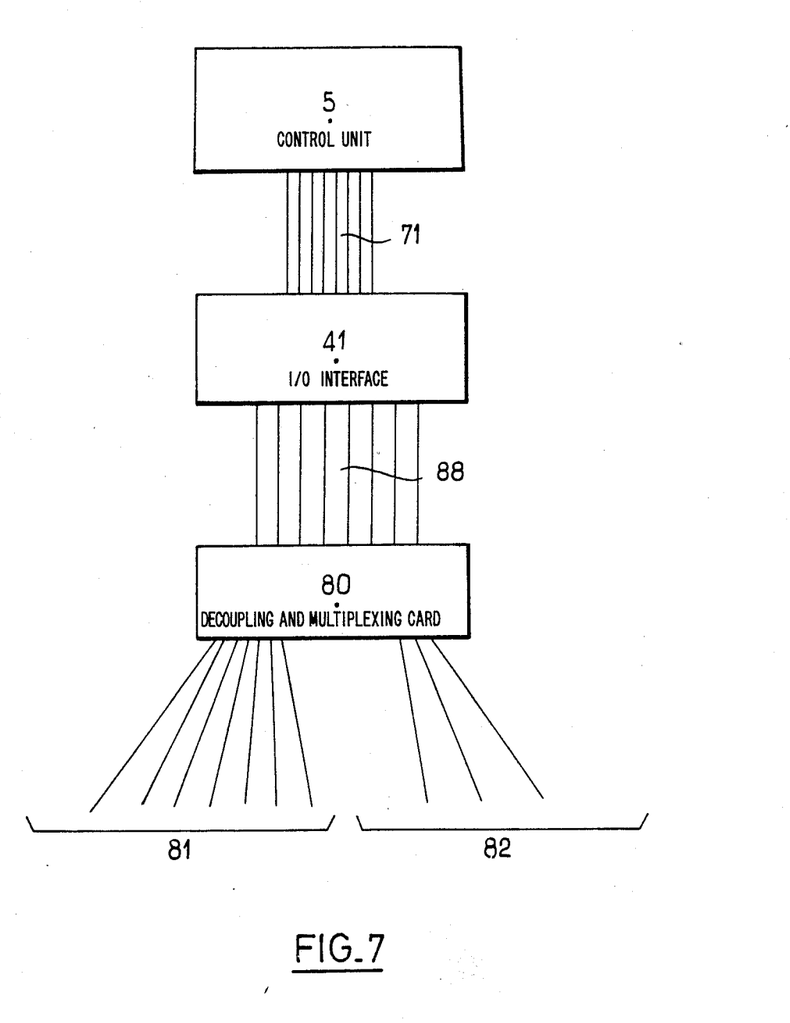
FIG. 7 is a diagram illustrating the connection circuits between the input/output-on/off and decoupling cards and a control unit of a device according to the invention.

FIG. 7 shows the connection circuit between the control unit 5 of FIG. 4 and the interface circuits providing the connection between the control unit 5 and the relay cabinet 40 for monitoring and control of the installation 1 being supervised. This connection circuit is not used with the industrial programmable controller 25 of FIG. 3. The parallel input/output bus 71 of the control unit 5 is connected to the interface input/output circuit 41. The circuit 41, which is shown in detail in FIG. 8, enables the acquisition of 16 on/off inputs 83 decoupled by relays 87 and filtered by RC filters 85. The interface circuit 41 also provides control of eight potential-free outputs 84 stored in the memory 86 and decoupled by the relays 87.

Figure 9:
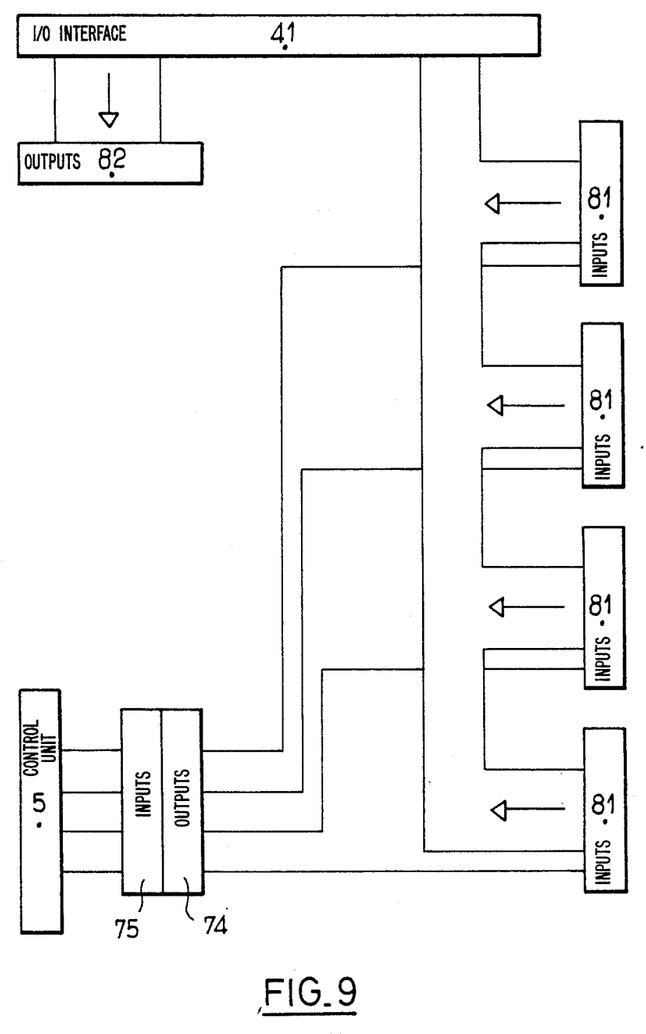
FIG. 9 is a block diagram of the decoupling card of the invention.

As FIG. 7 shows, the interface circuit 41 can be connected by an on/off connection circuit 88 to a decoupling and multiplexing card 80. The card 80 has sixteen inputs and eight outputs and enables acquisition of sixty-four on/off inputs 81 and control of eight potential-free on/off outputs 82 decoupled by relays. The decoupling and multiplexing card 80, which is shown in detail in FIG. 9, provides multiplexing of the sixteen inputs 83 of the interface circuit 41 with the four inputs/outputs 75, 74 of the control unit 5.

Figure 10:
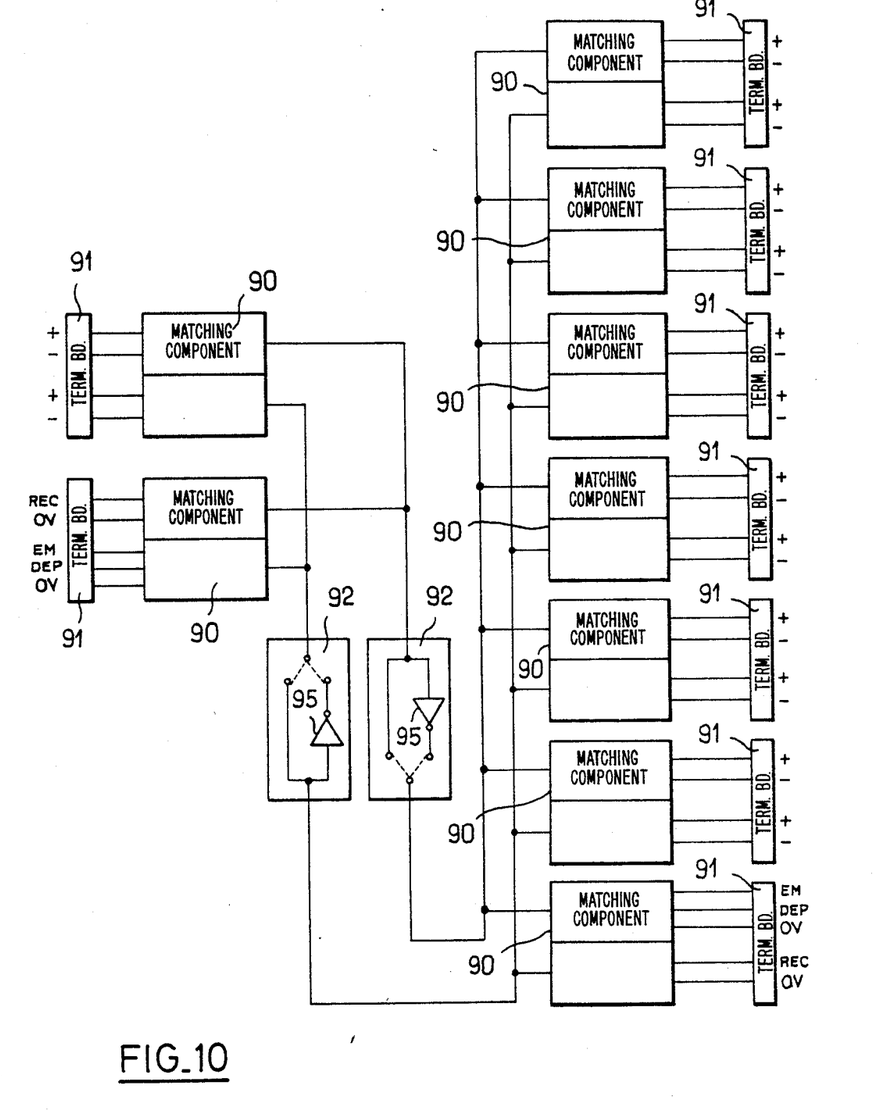
FIG. 10 is a block diagram of the diffuser circuit of the invention.

FIG. 10 shows details of the diffuser circuit 42. The diffuser circuit 42 provides the connection of a number of control units 5 to one pilot control unit 45, such as described with reference to FIG. 5. The connection is by means of matching components 90, connection components 92 comprising non-return diodes 95, and terminal boards 91 by way or RS 232C or 0–20 mA current loop type connection circuits.

Figure 11:
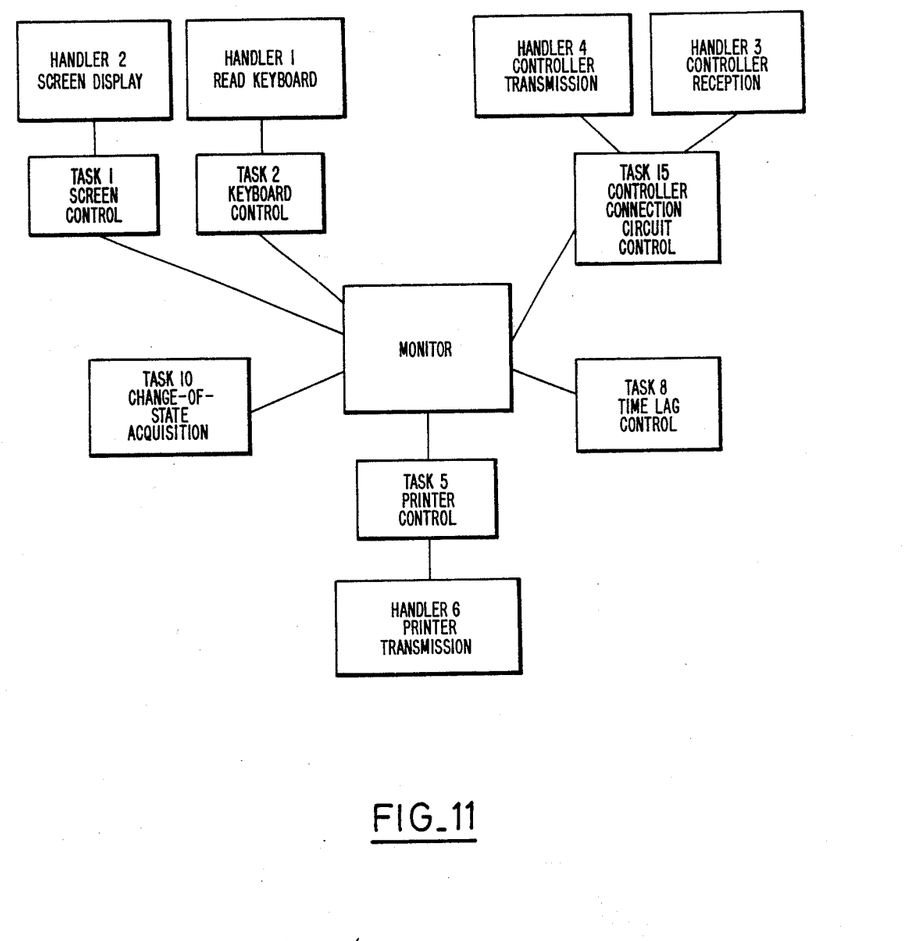
FIG. 11 is a block diagram showing the arrangement of the programming software of the control unit of a device according to the invention.
Figure 12:
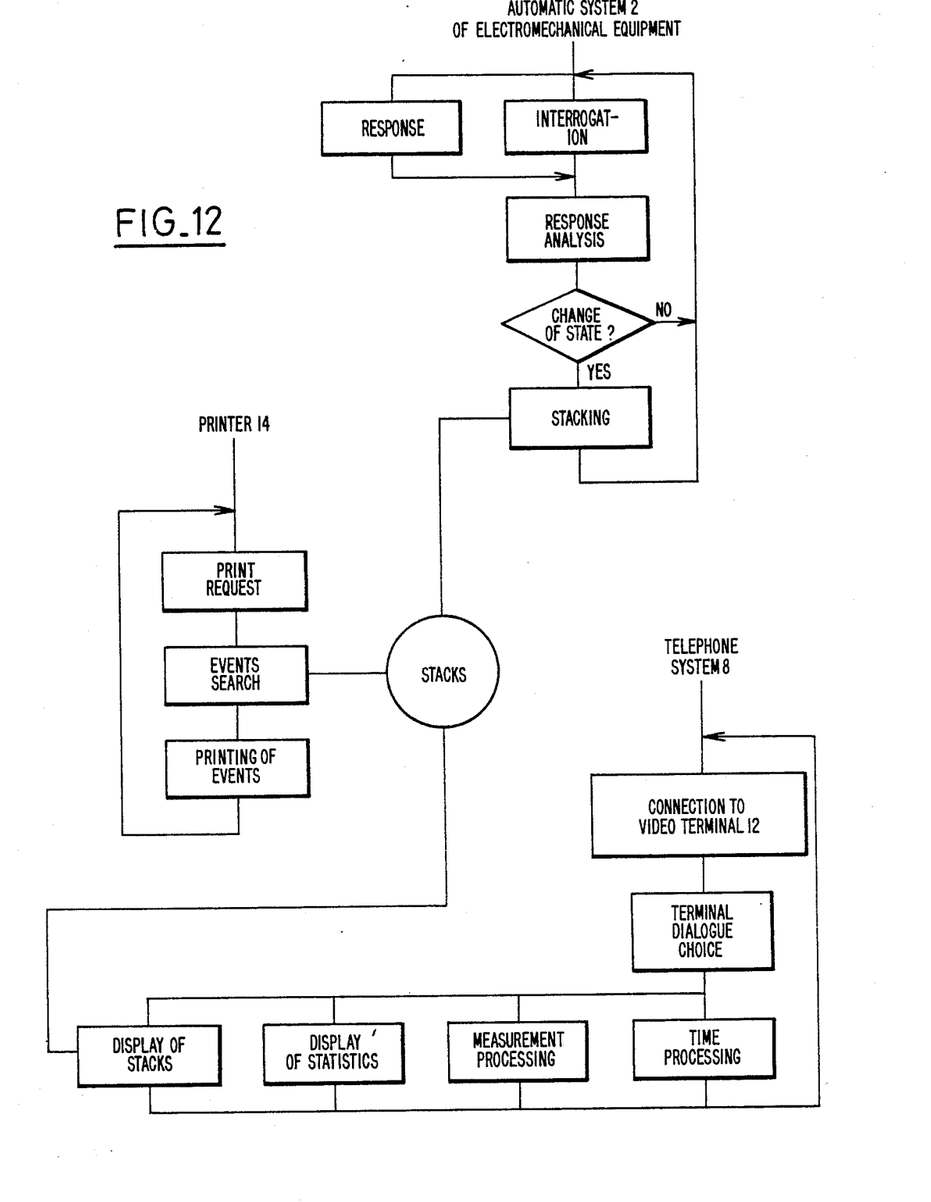
FIG. 12 is a flow chart showing the various operating phases of a device according to the invention.

A description is now given, with reference to FIGS. 11 and 12 and to the example of an electromechanical installation in the form of an escalator controlled by a programmable industrial controller, of the operation of a maintenance aiding device according to the invention. The programming software of the control unit 5 is arranged, as can be seen in FIG. 11, around a multi-task monitor monitoring sixteen tasks or program elements and eight control subprograms or handlers. The software uses tables (program routines or subroutines) comprising the information necessary for its operation, namely:

(1) Tables of the data from the programmable industrial controller 25;
(2) The stacks of events (states and defects of the installation);
(3) The tables of messages to be printed or displayed; and
(4) The correlation tables between data received and events to be stored.

There are two received-data tables, one for data received immediately and one for data received previously, as a means of detecting changes of state. These tables contain internal bits of the industrial programmable controller 25 read directly by the control unit 5.

There are also two events stacks - one for defects (All defects=stoppage with intervention) and one for states (ASI states=stoppage without intervention). These two stacks are arranged in the form of one hundred and twenty-eight events each comprising eight bytes.

Each event is arranged as follows:

| 7 | 6 | 5 | 4 | 3 | 2 | 1 | 0 |
|---|---|---|---|---|---|---|---|
| | | | Day | | | | |
| | | | Month | | | | |
| | | | Year | | | | |
| | | | Hour | | | | |
| | | | Minute | | | | |
| | | | Second | | | | |
| | | | Spare | | | | |
| | | Serial number of message | | | | | |

The tables of messages to be printed are arranged in the form of consecutive 36-character texts. The tables of the AII (stoppage with intervention) texts comprises fifty-one texts which are as follows for an escalator:

AAI TRIGGERING OF SAFETY RELAY
AAI BOTTOM RIGHT LANDING PLATE
AAI BOTTOM LEFT LANDING PLATE
AAI TOP RIGHT LANDING PLATE
AAI TOP LEFT LANDING PLATE
AAI DEFECT OF RIGHT OPERATION ROLLER
AAI BREAKAGE OF RIGHT HAND RAIL
AAI BREAKAGE OF LEFT HAND RAIL
AAI RIGHT HAND RAIL OUT OF RIM
AAI LEFT HAND RAIL OUT OF RIM
AAI RIGHT HAND RAIL DRIVE
AAI LEFT HAND RAIL DRIVE
AAI RIGHT TENSIONING CARRIAGE
AAI LEFT TENSIONING CARRIAGE
AAI BOTTOM FLAP DOOR
AAI TOP FLAP DOOR
AAI INSPECTION CONNECTOR
AAI SAFETY RELAYS NOT CORRELATING
AAI MOTOR SHAFT END COVER
AAI DEFECT OF RIGHT CHAIN ROLLER
AAI DEFECT OF LEFT CHAIN ROLLER
AAI OPERATING BRAKE FAILS TO DROP
AAI OPERATING BRAKE FAILS TO LIFT
AAI ADDITIONAL BRAKE FAILS TO DROP
AAI ADDITIONAL BRAKE FAILS TO LIFT
AAI MOTOR THERMAL RELAY
AAI OVERSPEED
AAI REVERSAL OF MOVEMENT DIRECTION
AAI CONTACTORS FAIL TO DROP
AAI FIRE

AAI BREAKAGE OF CHAIN
AAI STARTING DEFECT
AAI DEFECT IN RELAYS SAAI-XSAAI-RAR-UFS
AAI DEFECT OF PHASE RELAY
AAI DEFECT OF CEM OR 48 V AEM
AAI DEFECT OF C.P.I. POWER SUPPLY
AAI DEFECT OF 48 V AEM
AAI STOP PUSH BUTTON
AAI BISTABLE DEFECT
OIL PUMP THERMAL RELAY
LEVEL OF OIL PUMP
CDI MALFUNCTIONING
DEFECT - INTERMITTENT RUNNING
STOP PUSH BOTTOM, TOP BOX
STOP PUSH BOTTOM, BOTTOM BOX
AEM STOP PUSH BOTTOM
P.I. STOP PUSH BOTTOM
Spare
Spare
Spare The table of the ASI stoppage without intervention texts consists of thirty-two texts which for the same example are as follows:

MAINTENANCE CONTROL
NORMAL CONTROL
LOCAL "UP" OPERATION
REMOTE "UP" OPERATION
LOCAL "DOWN" OPERATION
REMOTE "DOWN" OPERATION
STOPPAGE OF OPERATION
SERVO-CONTROL STOPPAGE
INTERRUPTION 380 V PEF
RESET 380 V PEF
INTERRUPTION 48 V TAME
RESET 48 V TAME
ASI BOTTOM EMERGENCY STOP
ASI TOP EMERGENCY STOP
ASI BOTTOM RIGHT HAND RAIL ENTRY
ASI BOTTOM LEFT HAND RAIL ENTRY
ASI TOP RIGHT HAND RAIL ENTRY
ASI TOP LEFT HAND RAIL ENTRY
ASI BOTTOM RIGHT LANDING PLATE
ASI BOTTOM LEFT LANDING PLATE
ASI TOP RIGHT LANDING PLATE
ASI TOP LEFT LANDING PLATE
ASI DRIVE OF RIGHT HAND RAIL
ASI DRIVE OF LEFT HAND RAIL
ASI TRIGGERING OF RASI RELAY
Spare
Spare
Spare
Spare
Spare
Spare
Spare The programmable industrial controller 25 is continuously interrogated by the control unit 5 and its internal bits and inputs are read independently of its own operation. However, the program of the industrial programmable controller 25 positions some of its internal bits in a particular manner in order to trigger stacking of special events. Transmission proceeds at 2400 bauds.

At energization the microprocessor 50 recognizes the name of the escalator, the code for reading, and the code for writing at the video terminal 12. Dialogue with the video terminal 12 allows reading the state of the escalator, the events stacks, transmitting a text to the forwarding device, such text being written on the printer 14, consulting statistical messages, and time resetting.

In normal operation each AAI event is registered on the printer 14 upon its occurence. On request the last ten events of each stack can be printed out. On request the statistics can also be printed out. Again on request the last AAI defect and the last ASI stoppage which occurred in the maintenance phase can be printed out.

The control subprogram or handlers used are:
Handler 1: reception video terminal 12;
Handler 2: transmission video terminal 12;
Handler 3: reception programmable industrial controller 25;
Handler 4: transmission programmable industrial controller 25;
Handler 5: reception keyboard 23;
Handler 6: transmission printer 14.

The "transmission" handlers transmit characters contained in a buffer memory. The "reception" handlers store the received characters in a buffer memory.

The tasks used are:
Task 1: control of screen 9 of video terminal 12;
Task 2: control of keyboard 10 of video terminal 12;
Task 5: control of printer 14;
Task 8: control of time lags;
Task 10: acquisition of changes of state;
Task 15: control of connection circuit with the industrial programmable controller 25.

FIG. 12 is a flow chart which, with reference to the foregoing description of the various operating phases of the device, illustrates the various operation phases according to the invention.

As will be apparent, the maintenance aiding device according to the invention can provide real-time supervision of any kind of semi-automatic or fully automatic electromechanical installation from any geographical situation where a standard type video terminal (such as the one known as the "Minitel" terminal) is connected to the public telephone system. The device according to the invention also has the advantage of being flexible and easy to use and optimizes the maintenance operations of such installations.

It will be apparent to those skilled in the art that various modifications and variations can be made in the invention without departing from the scope or spirit of the invention. For example, a microcomputer connectable to the public telephone system could be used instead of the video terminal. The video terminal could also be connected to the control unit by means of a special telephone line. The diffuser circuit could be connected to a second diffuser circuit which is connected to a second set of control units in order to connect a larger number of control units to the public telephone system by way of a single modem. Thus, it is intended that the present invention covers the modifications and variations of this invention provided they come within the scope of the appended claims and their equivalents.

What is claimed:

1. A device for aiding maintenance of electromechanical installations having automatic monitor and control means for monitoring and controlling the operation of the electromechanical installations and for generating information on the operation of the electromechanical installations, comprising:
   means for connecting the maintenance aiding device to the automatic monitor and control means;

external supervision video terminal means adapted to communicate over a public telephone system;

a modem compatible with the public telephone system and capable of communicating with the external supervision video terminal means;

a plurality of control units each comprising processor means programmed to continuously analyze and process the information from the automatic monitor and control means, to analyze remote interrogations from the external supervision video terminal means and to transmit the information to the external supervision video terminal means by way of the public telephone system, means for storing the information, means for registering the information locally, and means for local interrogation of the control unit; and a pilot control unit, wherein each of said control units is connected to an electromechanical installation being supervised by an automatic monitor and control means and is connected, by way of the pilot control unit, to the public telephone system through the modem for communication with the external supervision video terminal means.

2. A device according to claim 1, wherein the pilot control unit connected to the control units is an electronic circuit identical to that of the control units; and further comprising a diffuser circuit, connecting the pilot control unit and the control units, for providing galvanic insulation between the pilot control unit and the control units.

* * * * *